United States Patent [19]

Bunda et al.

[11] 4,106,913
[45] * Aug. 15, 1978

[54] CATALYTIC CONVERTER HAVING VIBRATION-RESISTANT CATALYST CARRIER

[75] Inventors: Tsuchio Bunda, Okazaki; Itaru Niimi, Nagoya; Yasuhisa Kaneko; Fumiyoshi Noda, both of Toyota, all of Japan

[73] Assignee: Toyota Jidosha Kogyo Kabushiki Kaisha, Japan

[*] Notice: The portion of the term of this patent subsequent to Mar. 4, 1992, has been disclaimed.

[21] Appl. No.: 590,927

[22] Filed: Jun. 27, 1975

Related U.S. Application Data

[62] Division of Ser. No. 285,593, Sep. 1, 1972, abandoned.

[30] Foreign Application Priority Data

Sep. 3, 1971 [JP] Japan .................................. 46-67923

[51] Int. Cl.$^2$ .......................... F01N 3/15; F01N 7/14; B01J 35/04; B01J 37/08
[52] U.S. Cl. ............................ 23/288 FC; 252/455 R; 252/463; 423/212 C; 423/213.2; 423/213.5
[58] Field of Search .................. 23/288 FC; 423/212, 423/213.2, 213.5; 252/455, 463

[56] References Cited

U.S. PATENT DOCUMENTS

| | | | |
|---|---|---|---|
| 3,255,027 | 6/1966 | Talsma | 106/65 |
| 3,255,123 | 6/1966 | Haensel | 252/477 R |
| 3,397,154 | 8/1968 | Talsma | 252/463 |
| 3,753,746 | 8/1973 | Koerner | 106/65 |
| 3,798,006 | 3/1974 | Balluff | 23/288 FC |
| 3,869,410 | 3/1975 | Bunda et al. | 252/455 R |

*Primary Examiner*—Morris O. Wolk
*Assistant Examiner*—Bradley Garris
*Attorney, Agent, or Firm*—Stevens, Davis, Miller & Mosher

[57] ABSTRACT

A catalytic converter having a catalyst carrier for purifying exhaust gas of internal combustion engines for motor vehicles such as automobiles, motorcycles and motorbikes. The carrier comprises a plurality of catalyst carrier pieces which are molded into a predetermined block by binding or sintering at high temperature so that the block is resistant to vibration damage.

9 Claims, 6 Drawing Figures

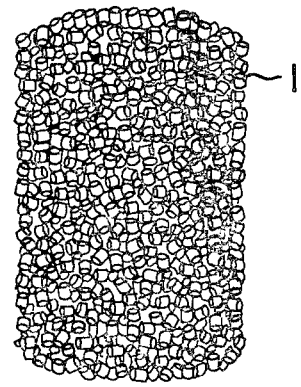
FIG. 1
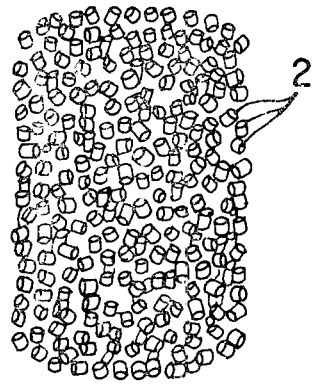
FIG. 2
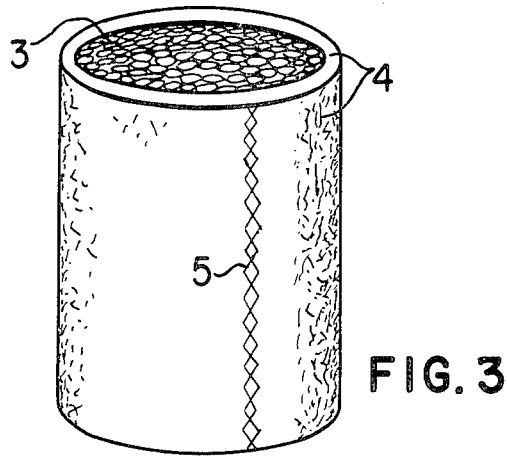
FIG. 3
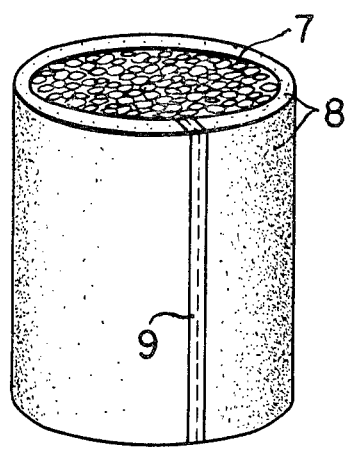
FIG. 4
FIG. 5
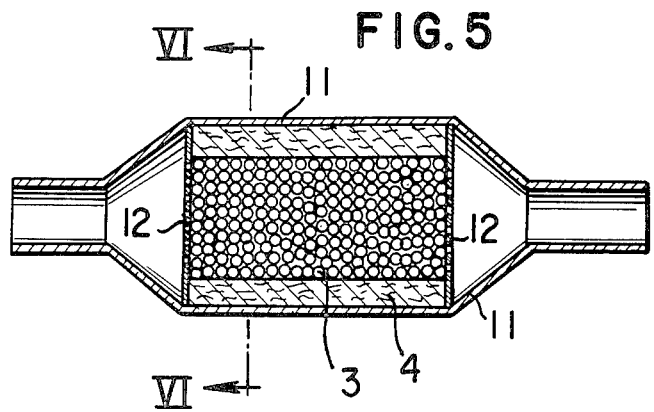
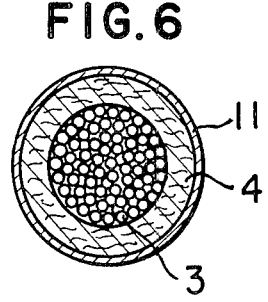
FIG. 6

4,106,913

CATALYTIC CONVERTER HAVING VIBRATION-RESISTANT CATALYST CARRIER

This is a division, of application Ser. No. 285,593, filed Sept. 1, 1972 and now abandoned.

BACKGROUND OF THE INVENTION

As components of the catalyst carrier for an exhaust gas purifier for internal combustion engines for motor vehicles such as automobiles, motorcycles or motorbicycles, there are available individual catalyst carriers in the form of regular or irregular granulates or pellets having a size of the order of millimeters. But in use these pieces are conventionally packed or filled as they are, in a catalyst muffler to serve as an exhaust gas purifier. This conventional packaging of the individual catalyst carriers has the problem that the individual carrier pieces often wear out, break or come out in the exhaust gas because of vibration of the exhaust system which occurs during driving, resulting in degradation of the catalyst activity. The exhaust gas pressure is abnormally raised, the exhaust gas flow is deflected, and the engine performance is lowered.

SUMMARY OF THE INVENTION

Therefore, a primary object of this invention is to provide a block of catalyst carrier for the exhaust gas purifiers, which is able to withstand vibrations and shocks which occur during driving.

The catalyst carrier of the present invention comprises a plurality of individual carriers in the form of regular or irregular particles or pellets, which are molded into a predetermined-shaped block by binding or sintering at high temperature. When the catalyst carrier block of the invention is incorporated into the exhaust gas purifier, damage such as wear or breakage of individual carriers may be prevented and the durability of the catalytic action may be increased.

Other objects and advantages of the invention will be apparent from the following description.

BRIEF DESCRIPTION OF THE DRAWINGS

FIGS. 1 and 2 are respectively front views of the catalyst carriers as formed into a shaped block according to the invention;

FIGS. 3 and 4 are respectively perspective views of the catalyst carrier block wrapped in a vibration buffer material;

FIG. 5 is a longitudinal sectional view of a catalyst muffler for an automobile, mounted with the catalyst carrier block; and FIG. 6 is a cross-sectional view along the line VI—VI of the muffler illustrated in FIG. 5.

DETAILED DESCRIPTION OF THE INVENTION

The present invention relates to a catalyst carrier for an exhaust gas purifier for intended combustion engines used in motor vehicles such as automobiles, motorcycles and motorbikes, and more particularly to a catalyst carrier capable of withstanding vibrations and shocks during driving, which may often cause damage to the carrier and consequently lower the catalytic action of the device.

The catalyst carrier of the invention is obtained by sintering a predetermined block of individual catalyst carriers which have previously been formed into pieces such as regular or irregular particles or pellets, alternatively, by firstly treating the above pieces with a ceramic slurry or a binding material and then sintering them as placed in a mold.

Carrier materials suitable for use in the present invention include $\gamma$-alumina, zircon, cordierite, a mixture of zircon and cordierite, mullite, a mixture of mullite and cordierite, $\beta$-spodumene, silicon carbide, and a mixture of kaolin-alumina sol-silica sol.

Binding materials suitable for use herein include, for example, a mixture of alumina sol-silica sol-kaolin, slurry of $\beta$-spodumene glass, alumina sol, silica sol, aluminum hydroxide, zirconia, aluminous cement and agents of alumina-silica-zirconia. Preferred binder materials are a mixture of alumina sol-silica sol-daolin, and a slurry of $\beta$-spodumene glass.

The invention will now be described with reference to the accompanying drawings, in which FIGS. 1 and 2 show a predetermined-formed block of particles 1 and pellets 2, respectively, of the individual catalyst carriers, both of which are obtained by sintering. It will be appreciated that the temperature at which sintering is suitable made differs depending on the type of the material of the catalyst carriers and also to what extent such sintering or binding is carried out. For example, when the material is alumina, heating to about 900° to about 1500° C will produce suitable binding or sintering for a prefixed formation.

In FIG. 3 there is illustrated the catalyst carrier 3 of the present invention charged with a platinum catalyst, and wrapped in a ceramic fiber textile 4 acting as a vibration buffer and fastened by a stainless steel wire 5. In place of the textile and the wire illustrated in FIG. 3, in FIG. 4 a mat of ceramic fiber 8 is used for wrapping the catalyst carrier 7 and an inorganic bonding agent 9 binds the margins of the mat 8.

The catalyst carrier thus wrapped in a suitable vibration buffer material, as shown in FIG. 3, is mounted in a catalytic muffler in the exhaust system of an internal combustion engine for motor vehicles such as automobiles. In FIGS. 5 and 6, the muffler is mounted with both ends of the catalyst carrier 3 held by wire nets and/or punched plates 12.

As described above, the catalyst carrier of the present invention is sintered into a block. When vibrations are applied to this block, no friction among particles or pellets of the individual catalyst carriers occurs, because they are bonded together. Therefore, no frictional wear due to vibration occurs.

Moreover, because no deformation occurs within the catalyst carrier of the present invention, it solves the problem of deflected flow of the exhaust gas, a condition which may appear in conventional carriers. The latter, which typically comprise a plurality of individual carriers, only filled or packed into a catalytic muffler, is likely to wear out and break from vibrations, which results in a reduced volume of useful catalytic material.

The following examples illustrate preferred embodiments according to the present invention:

EXAMPLE 1

Individual catalyst carriers 1 in FIG. 1 (ball-shaped having diameters of about 3 to about 5 mm) are immersed in a mixture of about 85% alumina sol, about 10% silica sol and about 5% kaolin. These carriers are then placed in a cylindrical alumina pot with diameter of about 100 mm and height of about 100 mm. After being air-dried for about 24 hours, the carriers are further dried at about 100° C for about 10 hours. A bonded block with diameter of about 100 mm and length of about 100 mm (as shown in FIG. 1) of the catalyst carriers is obtained. This block is treated to activate its surface and then charged with a metallic catalyst.

The block of catalyst carrier is wrapped in a ceramic fiber textile 4 (FIG. 3) fastened by a stainless steel wire 5 (FIG. 3), and mounted in the catalytic muffler 11 (FIGS. 5 and 6). This muffler was submitted to a running test covering a distance of about 1600 Km, and neither wear nor breakage of the catalyst carrier was observed.

EXAMPLE 2

From the mixture of kaolin, alumina sol and silica sol in the proportions of about 90%:5%:5%, are produced by extrusion the formed pieces 2 in FIG. 2; having diameters of about 4 mm and lengths of about 4 mm. These pieces are placed in a cylindrical alumina pot having diameter of about 100 mm and height of about 100 mm. After having air-dried for about 24 hours, the pieces are further dried at about 150° C for about 10 hours. The pieces are then subjected to sintering at about 1200° C for about 5 hours. A bonded block of the catalyst carriers as shown in FIG. 2 is obtained.

This block as wrapped and fastened as in Example 1 was mounted in a catalytic muffler. The muffler was submitted to an endurance test on a stand in which the engine ran at about 3,000 rpm. After a lapse of about 150 hours, neither wear nor breakage of the catalyst carriers was observed.

EXAMPLE 3

Hollow alumina balls with outside diameter of about 2 mm to about 5 mm (bulk density: about 0.3 g/cm$^3$) are immersed in a slurry of — spodumene ($Li_2O.Al_2O_3.4SiO_2$) glass. The balls are then placed in a cylindrical alumina pot with diameter of about 100 mm and height of about 100 mm. The balls are air-dried for about 24 hours and dried at about 150° C for about 10 further hours, and then subjected to sintering at about 1150° C for about 5 hours. A bonded block of the catalyst carriers as shown in FIG. 1 is obtained.

This block of the catalyst carriers was supported in the same way as in Example 1, and submitted to a vibration fatigue test in which vibration shocks equivalent to 20G were given to the block. After a lapse of about 10 hours, no breakage was observed. The loss of the total block weight was about 0.1% of the total weight measured prior to the test.

EXAMPLE 4

A mixture of about 10% zircon ($ZrO_2SiO_2$) and about 90% cordierite ($2MgO.2Al_2O_3.5SiO_2$) is kneaded on a kneading machine with addition of water amounting to about 8% of the mixture. From this mixture are formed hollow pieces with outside diameter of about 4 mm, inside diameter of about 2 mm and length of about 4 mm. The hollow pieces are then placed in a cylindrical alumina pot having diameter of about 100 mm and height of about 100 mm. After air drying for about 24 hours, the pieces are further dried for about 10 hours by heating to about 100° C, and subjected to sintering at about 1350° C for about 5 hours. A bonded block of the catalyst carriers is obtained.

The bonded block is wrapped in a mat formed of ceramic fiber 8 (FIG. 4) which has previously been impregnated with a mixture of silica sol and alumina sol in proportions of about 1:1. A bonding agent 9 (FIG. 4) is applied along the seam of the mat. After having air-dried for about 24 hours, the bonded block thus wrapped in the mat is further dried at about 150° C for about 10 hours.

The bonded block of the catalyst carriers was mounted in the catalytic muffler 11 (FIGS. 5 and 6). As a result of a road test for a distance of about 750 Km on a bumpy road, no breakage was observed. But in this test the mat of ceramic fiber 8 became powdery.

EXAMPLE 5

The carrier pieces are produced in the form of globes, using hydraulic ρ-alumina (measured true specific gravity of about 3.1, specific surface area of about 350 m$^2$/g, and average diameter of about 10μ).

The ρ-alumina powder is gradually introduced into the pan of a pan-type granulator with a pouring spray of water, and simultaneously the pan is rotated at about 17–22 rpm. for about 15–20 minutes. Thus, ρ-alumina formations in the form of globes of about 3–4 mm diameter are obtained.

These formations are put into a wire-net mold having a diameter of about 100 mm and height of about 100 mm. This mold is then sealed in a vinyl bag and left for about 3 hours. Thereafter, the wire-net mold enclosing formations of ρ-alumina is immersed in alumina sol (alumina sol of the type having Boehmite structure, containing about 10% $Al_2O_3$) for about 5 minutes. After having lifted the mold from the alumina sol and left it stationary at the room temperature for about 5 hours, it is dried at about 80° C for about 24 hours. The mold is then heated at the rate of about 50° C/hr. and maintained at about 800° C for about 2 hours. After having cooled the mold as placed in the oven, a sintered block comprising the globular catalyst carriers of ρ-alumina is obtained, having core density of about 0.72g/cm$^3$ and specific surface area of about 207 m$^2$/g.

The above carrier block, which was charged with a catalyst from the Cu—Ni group, was mounted in a catalytic muffler. The car equipped with this muffler was driven along a bad road for the distance of about 7500 Km. No breakage or cracking of the block occurred.

EXAMPLE 6

In the same way as in Example 5, formations of globular carriers of ρ-alumina of about 3–5 mm diameter are produced.

After having cured them in a sealed vinyl bag for about 3 hours, they are dried at about 110° C for about 10 hours. The temperature is raised at the rate of about 50° C/hr. up to about 700° C at which they are baked for about 2 hours. After having cooled in the oven, globular catalyst carriers made of ρ-alumina are obtained. These carriers are put in a wire-net mold having a diameter of about 100 mm and height of about 100 mm. This mold is immersed in a monoaluminum phosphate solution (containing about 58% $Al_2O_3.3P_2O_5.6H_2$). The mold is then heated, in sequence, at about 80° C for about 3 hours, at about 180° C for about 5 hours, at about 250° C for about 3 hours and at about 500° C for about 3 hours. After having cooled it in the oven, a block composed of globular catalyst carriers made of ρ-alumina is obtained.

The block was mounted in a catalytic muffler and submitted to a vibration test in which vibrations equivalent to about 15G were applied to the block during a period of about 100 hours. No cracking of the block was observed.

What is claimed is:

1. A catalytic converter for the exhaust system of an internal combustion engine, comprising: a converter casing, and a vibration resistant sintered catalyst carrier disposed in said casing comprising a plurality of ceramic catalyst carrier pieces coated with a binding material, both of which are in their sintered condition said carrier having a catalyst dispersed therein.

2. The converter of claim 1 additionally comprising a wrapping of vibration buffer material around the catalyst carrier and within the casing.

3. The converter of claim 1 wherein said ceramic carrier pieces comprise γ-alumina or alumina.

4. The converter of claim 1 wherein said ceramic carrier pieces comprise zircon.

5. The converter of claim 1 wherein said ceramic carrier pieces comprise silicon carbide.

6. The converter of claim 1 wherein said ceramic carrier pieces comprise a material selected from the group consisting of: silica, cordierite, mullite, β-spodumene, and kaolin.

7. The converter of claim 1 wherein said binding material comprises a material selected from the group consisting of alumina, aluminum hydroxide and aluminous cement.

8. The converter of claim 1 wherein said binding material comprises a material selected from the group consisting of silica, kaolin, and β-spodumene.

9. The converter of claim 1 wherein said binding material comprises zirconia.

* * * * *